US010592856B2

(12) United States Patent
Szmajda et al.

(10) Patent No.: US 10,592,856 B2
(45) Date of Patent: *Mar. 17, 2020

(54) METHODS AND APPARATUS FOR PROCESSING AND MARKETING INVENTORY VIA MULTIPLE CHANNELS

(71) Applicant: Optoro, Inc., Lanham, MD (US)

(72) Inventors: Joshua Szmajda, Greenbelt, MD (US); Adam Vitarello, Washington, DC (US)

(73) Assignee: Optoro, Inc., Lanham, MD (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/424,506

(22) Filed: Feb. 3, 2017

(65) Prior Publication Data
US 2017/0147973 A1 May 25, 2017

Related U.S. Application Data

(63) Continuation of application No. 13/786,770, filed on Mar. 6, 2013, now Pat. No. 9,563,870.

(60) Provisional application No. 61/607,410, filed on Mar. 6, 2012.

(51) Int. Cl.
G06Q 10/08 (2012.01)
G06Q 30/02 (2012.01)

(52) U.S. Cl.
CPC ....... *G06Q 10/087* (2013.01); *G06Q 30/0206* (2013.01)

(58) Field of Classification Search
CPC ............. G06Q 10/087; G06Q 30/0206; G06Q 30/0253; G06Q 20/203
USPC ......................................................... 705/28
See application file for complete search history.

(56) References Cited

U.S. PATENT DOCUMENTS

| 6,549,891 | B1 | 4/2003 | Rauber et al. |
| 6,754,637 | B1 | 6/2004 | Stenz |
| 6,915,274 | B2 | 7/2005 | Abhyanker |
| 7,353,199 | B1 | 4/2008 | DiStefano, III |
| 7,376,601 | B1 | 5/2008 | Aldridge |

(Continued)

FOREIGN PATENT DOCUMENTS

WO    WO 2001/067344 A1    9/2001

OTHER PUBLICATIONS

Office Action for U.S. Appl. No. 13/786,770, dated Feb. 25, 2015, 14 pages.

(Continued)

Primary Examiner — Luna Champagne
(74) Attorney, Agent, or Firm — Cooley LLP

(57) ABSTRACT

A non-transitory processor-readable medium stores code representing instructions to be executed by a processor. The code stored in the medium includes code to cause the processor to receive a first signal indicating a quantity of an item listed on a website of a first marketplace from a set of marketplaces. The item is listed on a website of each marketplace from the set of marketplaces. The code stored in the medium includes code to cause the processor to change, based on the first signal, an inventory parameter associated with the item from a first value to a second value. The code stored in the medium includes code to cause the processor to send, to a device of each marketplace, a second signal indicating the updated inventory parameter such that the item remains listed on the web site of each marketplace until the second value is zero.

10 Claims, 4 Drawing Sheets

(56) References Cited

U.S. PATENT DOCUMENTS

| | | |
|---|---|---|
| 7,426,484 B2 | 9/2008 | Joyce et al. |
| 7,472,077 B2 | 12/2008 | Roseman et al. |
| 7,543,743 B1 | 6/2009 | Yu et al. |
| 7,596,516 B2 | 9/2009 | Starkowsky et al. |
| 7,600,682 B2 | 10/2009 | Bezos et al. |
| 7,617,133 B1 | 11/2009 | Antony et al. |
| 7,711,603 B2 | 5/2010 | Vanker et al. |
| 7,797,164 B2 | 9/2010 | Junger et al. |
| 7,822,651 B2 | 10/2010 | Hume et al. |
| 7,881,986 B1 | 2/2011 | Pape et al. |
| 7,890,373 B2 | 2/2011 | Junger |
| 7,917,405 B2 | 3/2011 | Bonner et al. |
| 7,958,061 B1 | 6/2011 | Antony et al. |
| 8,001,003 B1 | 8/2011 | Robinson et al. |
| 8,001,017 B1 | 8/2011 | Franco |
| 8,050,974 B2 | 11/2011 | Lopez et al. |
| 8,073,740 B1 | 12/2011 | Siegel et al. |
| 8,108,265 B2 | 1/2012 | Bonner et al. |
| 8,156,007 B1 | 4/2012 | Anthony et al. |
| 8,160,929 B1 | 4/2012 | Park et al. |
| 8,224,708 B1 | 7/2012 | Agarwal et al. |
| 8,266,008 B1 | 9/2012 | Siegel et al. |
| 8,285,608 B2 | 10/2012 | Brown et al. |
| 8,386,323 B1 | 2/2013 | Chenault et al. |
| 8,396,755 B2 | 3/2013 | Bonner et al. |
| 8,408,459 B1 | 4/2013 | Alonzo et al. |
| 8,412,560 B1 | 4/2013 | Masud et al. |
| 8,447,664 B1 | 5/2013 | Pape et al. |
| 8,447,665 B1 | 5/2013 | Schoenharl et al. |
| 8,458,010 B1 | 6/2013 | Geoffrin et al. |
| 8,463,665 B1 | 6/2013 | Pape et al. |
| 8,533,058 B1 | 9/2013 | Agarwal et al. |
| 8,533,126 B1 | 9/2013 | Antony et al. |
| 8,566,137 B1 * | 10/2013 | Cabrera ............... G06Q 30/06 705/22 |
| 2001/0007099 A1 | 7/2001 | Rau et al. |
| 2001/0047308 A1 | 11/2001 | Kaminsky et al. |
| 2002/0010634 A1 | 1/2002 | Roman et al. |
| 2002/0019785 A1 | 2/2002 | Whitman |
| 2002/0072999 A1 | 6/2002 | Andres et al. |
| 2002/0116281 A1 | 8/2002 | Costello et al. |
| 2003/0195778 A1 | 10/2003 | Smith |
| 2004/0059663 A1 | 3/2004 | Herzog et al. |
| 2004/0153379 A1 | 8/2004 | Joyce et al. |
| 2004/0193438 A1 | 9/2004 | Stashluk, Jr. et al. |
| 2004/0215531 A1 | 10/2004 | Stashluk, Jr. et al. |
| 2005/0055286 A1 | 3/2005 | Zimet |
| 2005/0192816 A1 | 9/2005 | Wechsel |
| 2005/0216368 A1 | 9/2005 | Wechsel |
| 2006/0089897 A1 | 4/2006 | Maas et al. |
| 2006/0149577 A1 | 7/2006 | Stashluk, Jr. et al. |
| 2007/0055616 A1 | 3/2007 | Clay et al. |
| 2007/0073592 A1 * | 3/2007 | Perry ................. G06Q 30/0601 705/26.1 |
| 2007/0156439 A1 | 7/2007 | Fyda et al. |
| 2007/0250390 A1 * | 10/2007 | Lee ........................ G06Q 30/02 705/14.51 |
| 2008/0004981 A1 * | 1/2008 | Gopalpur ............. G06Q 20/203 705/26.81 |
| 2008/0077475 A1 | 3/2008 | McElhiney et al. |
| 2008/0077476 A1 | 3/2008 | McElhiney et al. |
| 2008/0077477 A1 | 3/2008 | McElhiney et al. |
| 2008/0077507 A1 | 3/2008 | McElhiney et al. |
| 2008/0077542 A1 | 3/2008 | McElhiney et al. |
| 2008/0082346 A1 | 4/2008 | Hoopes et al. |
| 2008/0189156 A1 * | 8/2008 | Voda .................... G06Q 10/063 705/7.33 |
| 2008/0255890 A1 | 10/2008 | Hilliard |
| 2009/0144749 A1 * | 6/2009 | Van Luchene ........ G06F 16/951 719/313 |
| 2009/0299881 A1 | 12/2009 | Del Rosario et al. |
| 2010/0017311 A1 | 1/2010 | Gallagher |
| 2011/0264594 A1 | 10/2011 | Govindaraju |
| 2012/0123950 A1 | 5/2012 | Gventer et al. |
| 2012/0284113 A1 | 11/2012 | Pollak |
| 2013/0006815 A1 * | 1/2013 | Kassaei ................. G06Q 30/02 705/27.1 |
| 2013/0218784 A1 | 8/2013 | Alonzo et al. |
| 2013/0339191 A1 | 12/2013 | Shanfeld et al. |
| 2014/0136289 A1 | 5/2014 | Settgast |

OTHER PUBLICATIONS

Final Office Action for U.S. Appl. No. 13/786,770, dated Jul. 15, 2015, 15 pages.

Office Action for U.S. Appl. No. 13/786,770, dated Apr. 29, 2016, 6 pages.

* cited by examiner

300

```
┌─────────────────────────────────────────────────────────────┐
│ Receive, via a first source, a first signal associated with │
│ a quantity of an item listed on a website of a first        │
│ marketplace from a set of marketplaces.                     │
│ 302                                                         │
└─────────────────────────────────────────────────────────────┘
                              ↓
┌─────────────────────────────────────────────────────────────┐
│ Receive, via a second source, a second signal associated    │
│ with the quantity of the item listed on the website of the  │
│ first marketplace from the set of marketplaces, the second  │
│ source being different from the first source.               │
│ 304                                                         │
└─────────────────────────────────────────────────────────────┘
                              ↓
┌─────────────────────────────────────────────────────────────┐
│ Determine, based on at least one of the first signal or the │
│ second signal, an inventory parameter associated with the   │
│ item.                                                       │
│ 306                                                         │
└─────────────────────────────────────────────────────────────┘
                              ↓
┌─────────────────────────────────────────────────────────────┐
│ Optionally, define, based on the inventory parameter, a     │
│ reservation record for the item, the reservation record     │
│ including a pending order quantity.                         │
│ 308                                                         │
└─────────────────────────────────────────────────────────────┘
                              ↓
┌─────────────────────────────────────────────────────────────┐
│ Send, to a device of each marketplace from the set of       │
│ marketplaces, a third signal indicating the inventory       │
│ parameter.                                                  │
│ 310                                                         │
└─────────────────────────────────────────────────────────────┘
                              ↓
┌─────────────────────────────────────────────────────────────┐
│ Optionally, receive a fourth signal indicating a validated  │
│ order associated with the item placed via the website of    │
│ the first marketplace from the set of marketplaces, the     │
│ fourth signal including an ordered quantity value.          │
│ 312                                                         │
└─────────────────────────────────────────────────────────────┘
                              ↓
┌─────────────────────────────────────────────────────────────┐
│ Optionally, reconcile the validated order with the          │
│ reservation record based at least on the pending order      │
│ quantity and the ordered quantity value.                    │
│ 314                                                         │
└─────────────────────────────────────────────────────────────┘
```

FIG. 3

METHODS AND APPARATUS FOR PROCESSING AND MARKETING INVENTORY VIA MULTIPLE CHANNELS

CROSS-REFERENCE TO RELATED APPLICATIONS

This application is a continuation of U.S. patent application Ser. No. 13/786,770, now U.S. Pat. No. 9,563,870, filed Mar. 6, 2013, and entitled "Methods and Apparatus for Processing and Marketing Inventory Via Multiple Channels," which claims priority to and the benefit of U.S. Provisional Patent Application No. 61/607,410, filed Mar. 6, 2012, and entitled "Systems and Methods for Processing and Marketing Inventory of Various Conditions," the disclosure of each of which is incorporated herein by reference in its entirety.

BACKGROUND

Embodiments described herein relate generally to systems and methods for managing, processing, dispositioning, and marketing inventory of various conditions to maximize recovered value and speed to sale. The system and methods described herein, include, for example, inventory tracking and management, automatic Multi-Channel posting, pricing, marketing (e.g., advertising generation), and order fulfillment.

Some known systems can process and/or market returned inventory or products. Such known systems, however, lack the ability to post and/or advertise products in varying conditions (e.g., new, open-box, used, damaged, etc.) on multiple marketplaces simultaneously. These known systems typically lack the ability to determine price and/or value of the products in the secondary market during the initial intake process. As a result, these known systems typically do not automatically price, describe, post and/or advertise products in varying conditions at the point of the initial intake process.

Moreover, some known systems can track and report changes in inventory status of a product advertised at multiple marketplaces. Such known systems, however, typically use standard channels (e.g., by accessing a merchant interface portion of a website via the application programming interface) to receive information of the inventory status after an order of the product is validated at a marketplace. As a result, the information of inventory status is typically not received in real-time (or substantially in real-time), thus causing a potential "double-sell" problem. To avoid such a "double-sell" problem, some known systems stop advertising a product or listing the full quantity of a product on the marketplaces when the quantity of the product drops below a certain threshold. As a result, such known systems are typically not suitable for products with low quantities.

Thus, a need exists for systems and methods for tracking inventory status of a product in real-time (or substantially real-time) and listing the full quantity of a product at any quantity on multiple marketplaces.

SUMMARY

A non-transitory processor-readable medium stores code representing instructions to be executed by a processor. The code stored in the medium includes code to cause the processor to receive a first signal indicating a quantity of an item listed on a website of a first marketplace from a set of marketplaces. The item is listed on a website of each marketplace from the set of marketplaces. The code stored in the medium includes code to cause the processor to update, based on the first signal, an inventory parameter associated with the item from a first value to a second value. The code stored in the medium includes code to cause the processor to send, to a device of each marketplace, a second signal indicating the updated inventory parameter such that the item remains listed on the website of each marketplace until the second value is zero.

BRIEF DESCRIPTION OF THE DRAWINGS

FIG. 3 is a flow chart illustrating a method for managing inventory, according to an embodiment.

DETAILED DESCRIPTION

Figure 1:
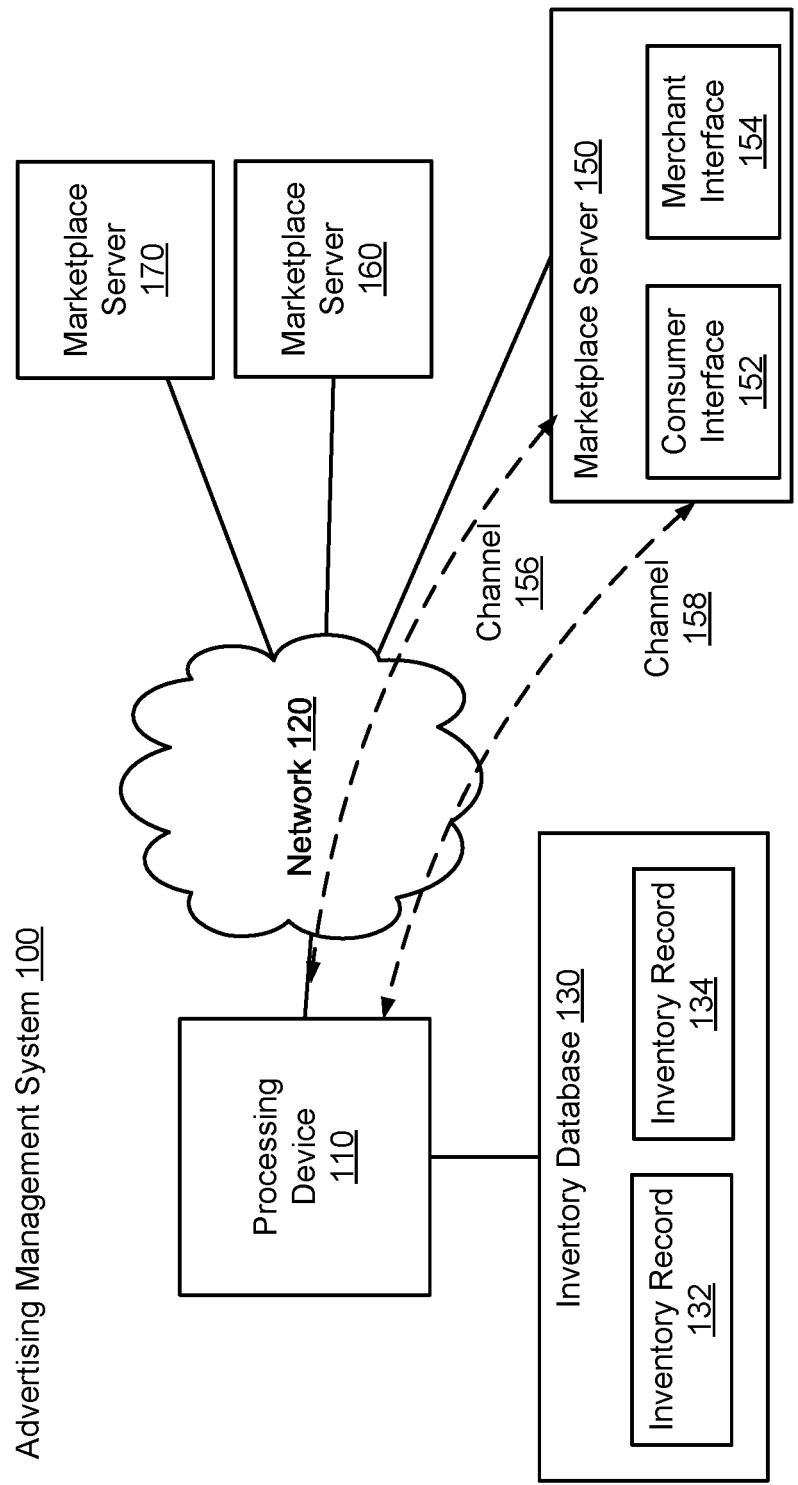
FIG. 1 is a schematic diagram of an advertising management system configured to process and market items via multiple channels, according to an embodiment.

In some embodiments, an advertising management system can be configured to perform a process for managing, automatic processing, dispositioning, multi-channel marketing, advertising generation, and/or order fulfillment on inventory in various conditions (e.g., new, open-box, used, damaged, etc.) with minimal or limited inventory. Such an advertising management system can manage inventory associated with multiple marketplaces and automatically update inventory data based on information retrieved via any number of mechanisms from any of the multiple marketplaces. In this manner, the system can, in real or quasi-real time, update the inventory of the listed item, thereby minimizing and/or eliminating the potential for orders to be taken after the item has sold out. In this manner, low quantity items, including items of a single quantity, can remain listed simultaneously on multiple different marketplaces.

Additionally, the advertising management system can take limited, basic condition information of the product and automatically determine an optimal (or substantially optimal) price for the product based at least in part on the information. The advertising management system can further automatically generate advertisements based on the determined price, post the advertisements simultaneously on multiple selling channels, and enable an efficient order fulfillment process for located buyers. In some embodiments, the advertising management system can determine where and/or how to remarket inventory of various types and/or conditions (e.g., new, open-box, used, refurbished, salvaged, etc.) by using, for example, secondary market product valuations. In such embodiments, the advertising management system can regularly adjust the advertising based on, for example, external pricing data, internal pricing data, market trends, and/or the like.

In some embodiments, a non-transitory processor-readable medium stores code representing instructions to be executed by a processor. The code stored in the medium includes code to cause the processor to receive a first signal indicating a quantity of an item listed on a website of a first marketplace from a set of marketplaces. The item can be listed substantially simultaneously on a website of each marketplace from the set of marketplaces. In some instances, the first signal can indicate a pending order associated with the item. The code stored in the medium also includes code to cause the processor to update, based on the first signal, an inventory parameter associated with the item to change the inventory parameter from a first value to a second value. In some instances, the code stored in the medium can include code to cause the processor to define, based on the first signal, a reservation record and/or a reservation event associated with the item. Such a reservation record can include a quantity parameter associated with a difference between the first value and the second value. Such a reservation event need not be a data base record, but rather can be an event or other identifier indicating that a particular item is reserved. The code stored in the medium further includes code to cause the processor to send, to a device of each marketplace from the set of marketplaces, a third signal indicating the updated inventory parameter such that the item remains listed on the web site of each marketplace from the set of marketplaces until the second value is zero.

In some instances, the code stored in the medium can include code to cause the processor to receive, from the device of the first marketplace, a fourth signal associated with an order for the item. The fourth signal can include an ordered quantity value. Moreover, the code stored in the medium can include code to cause the processor to reconcile the order with the reservation record based at least on the ordered quantity value and the quantity parameter included in the reservation order. Additionally, the code stored in the medium can include code to cause the processor to transmit a "cancel value" and/or cancel a reservation record and/or reservation event for orders that were canceled by a customer and/or a marketplace. Thus, methods and processes associated with reconciliation also include canceling orders.

In some instances, the first signal can be received using an application programming interface (API) to access a merchant interface portion of the web site of the first marketplace. In some other instances, the code stored in the medium can include code to cause the processor to scrape the merchant interface portion, or a consumer interface portion, of the website of the first marketplace to obtain information associated with the quantity of the item listed on the web site of the first marketplace. In such instances, the first signal can include the information. In yet other instances, the code stored in the medium can include code to cause the processor to send a second signal to initiate an order associated with the item via the consumer interface portion of the website of the first marketplace. Similarly stated, the code stored in the medium can include code to cause the processor to send a second signal to "pose" as a customer placing an order via the website of the first marketplace. In such instances, the first signal can be received in response to the initiation of the "mock" order.

In some embodiments, a method includes receiving, via a first source, a first signal associated with a quantity of an item listed on a website of a first marketplace from a set of marketplaces. The item is listed on a website of each of the marketplaces. A second signal associated with the quantity of the item listed on the website of the first marketplace is received, via a second source that is different from the first source. An inventory parameter associated with the item is determined based on at least one of the first signal or the second signal. A third signal indicating the inventory parameter ending is sent to a device of each of the marketplaces.

As used herein, a module can be, for example, any assembly and/or set of operatively-coupled electrical components associated with performing a specific function, and can include, for example, a memory, a processor, electrical traces, optical connectors, software (executing in hardware) and/or the like. As used herein, the singular forms "a," "an" and "the" include plural referents unless the context clearly dictates otherwise. Thus, for example, the term "a tracking module" is intended to mean a single module or a combination of modules configured to perform functions associated with tracking inventory status associated with items advertised at multiple marketplaces.

FIG. 1 is a schematic diagram of an advertising management system 100 configured to process and market products of an inventory, according to an embodiment. In some embodiments, the advertising management system 100 can also function as, for example, an asset recovery system.

As shown in FIG. 1, a processing device 110 of the advertising management system 100 is operatively coupled to a set of marketplace servers 150, 160 and 170 via a network 120. The processing device 110 can be configured to execute a processing method and a selling method to process and market products of an inventory, as described in detail with respect to FIGS. 5-6. Particularly, the processing device 110 can be configured to manage inventory data associated with the products advertised at multiple marketplaces, as described in detail with respect to FIGS. 3-4. In some embodiment, the processing device 110 can be any device configured to process data and communicate with multiple marketplace servers such as, for example, a server, workstation, computing device, mobile communication device, tablet, desktop, laptop, and/or the like. Details of such a processing device are further described with respect to FIG. 2.

The processing device 110 is operatively coupled to an inventory database 130 that includes a set of inventory records (e.g., inventory records 132, 134). The inventory database 130 can be, for example, a relational database, a cloud database, a distributed database, a database warehouse, an embedded database, or any other type of data storage structure. Each inventory record stored in the database 130 can be associated with a product that is advertised and/or listed by one or multiple marketplaces (e.g., the marketplaces associated with the marketplace servers 150, 160, 170). In other words, the inventory database 130 includes data and/or represents items that can be shared by the multiple marketplaces. Furthermore, in some embodiments, the inventory database 130 can include one or more sub-databases storing information associated with orders placed at any of the multiple marketplaces. For example, the inventory database 130 can include a sub-database storing information of pending orders that are placed at the multiple marketplaces. For another example, the inventory database 130 can include a sub-database storing information of accepted orders that are validated at the multiple marketplaces.

In some embodiments, as shown in FIG. 1, the inventory database 130 can be hosted at a device (e.g., a data storage device) external and operatively coupled to the processing device 110. In some other embodiments, the inventory database 130 can be hosted within a memory of the processing device 110. In yet other embodiments, the inventory database 130 and the processing device 110 can be collocated within a single device such as, for example, a database server.

Each marketplace server 150, 160 or 170 is associated with a marketplace from a set of marketplaces. Each marketplace server 150, 160 or 170 can be, for example, a computer server configured to post and manage online advertisements for the associated marketplace. In some embodiments, the marketplace servers 150, 160 and 170 can host and execute e-commerce websites for their associated marketplaces such as, for example, Amazon.com, eBay.com, Blinq.com, and/or the like.

In some embodiments, each marketplace server 150, 160 or 170 can include a consumer interface (e.g., the consumer interface 152 of the marketplace server 150) and a merchant interface (e.g., the merchant interface 154 of the marketplace server 150) associated with the e-commerce website hosted by the marketplace server. Specifically, for example, the consumer interface 152 of the marketplace server 150 can be configured to host, execute and maintain an e-commerce web site that is presented to consumers of the marketplace associated with the marketplace server 150. Such an e-commerce website for consumers can provide information that enables the consumers to shop for products provided by the merchants via the website. The consumer interface 152 of a marketplace server 150 can be configured to execute, for example, an advertisement perusal mechanism, an order placement mechanism, and/or the like.

The merchant interface 154 of the marketplace server 150 can be configured to host, execute and maintain an e-commerce web site that is presented to merchants of the marketplace associated with the marketplace server 150. Such an e-commerce website interface for merchants can provide information that enables the merchants to manage and sell their products to consumers via the website. In some embodiments, the merchant interface 154 of the marketplace server 150 can include, for example, a web-based merchant management portal associated with the marketplace. The merchant interface 154 of the marketplace server 150 can be configured to execute, for example, an advertisement placement mechanism, an order receiving mechanism, a web-based management interface, and/or the like.

In some embodiments, the processing device 110 can be configured to communicate with and retrieve information from a marketplace server (e.g., the marketplace server 150, 160 or 170) via one or multiple channels. Such a channel can be associated with, for example, an API access to the merchant interface of the marketplace server, extracting information from an e-commerce website for consumers hosted by the consumer interface (e.g., the consumer interface 152) of the marketplace server using a web scraping (or web harvesting, web data extraction) technique, extracting information from an e-commerce website for merchants hosted by the merchant interface (e.g., the merchant interface 154) of the marketplace server using a web scraping technique, and/or the like. For example, as shown in FIG. 1, the processing device 110 can retrieve information associated with pending orders of a product via the channel 156, which can include an API access to the merchant interface 154 of the marketplace server 150. Meanwhile, the processing device 110 can also receive information associated with advertisements of a product from the consumer interface 152 of the marketplace server 150 via the channel 158, which can be associated with scraping the information from the e-commerce website hosted by the marketplace server 150. Details of retrieving information via multiple channels are further described with respect to FIGS. 3 and 4. In this manner, as described herein the processing device 110 can update the inventory database 130 based on information from the multiple channels (e.g., channel 156 and channel 158), thereby improving the accuracy and speed with which inventory information is updated.

The network 120 can be any network that operatively couples the processing device 110 to the marketplace servers 150, 160 and 170. In some embodiments, the network 120 can include a portion of, for example, a wired and/or wireless network, such as an Ethernet, a Fiber Channel network, a WLAN (wireless local area network), the Internet, etc. Although not shown in FIG. 1, in some embodiments, the processing device 110 can be coupled to a marketplace server without using any network or intermediate device. Although shown as the processing device 110 being operatively coupled to three marketplace servers 150, 160 and 170, in other embodiments, a processing device configured to process and market products of an inventory can be operatively coupled to any number of marketplace servers.

In some embodiments, although not shown in FIG. 1, the processing device 110 can be operatively coupled to a set of peripheral devices such as, for example, a computer, printer, scanner, and/or the like. In such embodiments, the processing device 110 can be directly coupled to the peripheral devices or operatively coupled to the peripheral devices via other switching devices or network. The processing device 110 can be configured to interact with the peripheral devices in executing the processing and/or selling methods. Additionally, the processing device 110 can be accessed and operated by a user (not shown in FIG. 1). Such a user can be, for example, an operator, a manger, an administrator, etc., of the advertising management system 100. In some embodiments, the user can configure settings of the processing device 110, and operate the processing device 110 such that the processing device 110 can execute the processing and/or selling methods described with respect to FIGS. 5-6.

Figure 2:
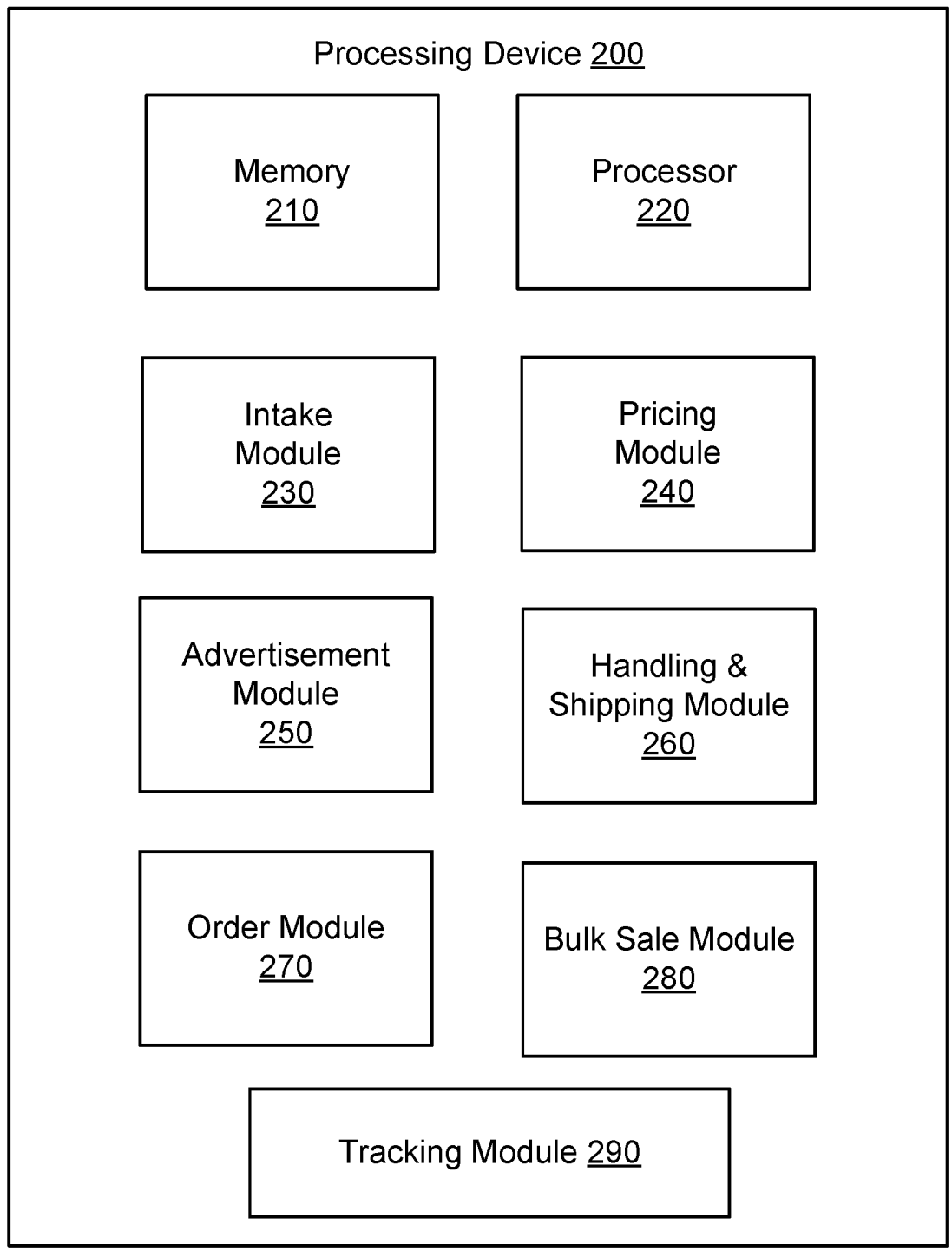
FIG. 2 is a schematic block diagram of a processing device configured to manage inventory and execute processing and selling methods, according to an embodiment.

FIG. 2 is a schematic block diagram of a processing device 200 configured to manage inventory and execute processing and selling methods, according to an embodiment. The processing device 200 can be structurally and functionally similar to the processing device 110 shown and described with respect to FIG. 1. As shown in FIG. 2, the processing device 200 includes a memory 210, a processor 220, an intake module 230, a pricing module 240, an advertisement module 250, a handling & shipping module 260, an order module 270, a bulk sale module 280, and a tracking module 290. Although the processing device 200 is shown as including the modules 230-290, in other embodiments, a processing device configured to mange, process and market inventory can include more or less modules than the modules shown in FIG. 2.

The memory 210 can be any suitable computer memory. For example, the memory 210 can be random-access memory (RAM), read-only memory (ROM), flash memory, erasable programmable read-only memory (EPROM), electrically erasable programmable read-only memory (EEPROM), and/or other suitable memory. In some embodiments, the memory 210 can be configured to store code representing processor instructions for execution by the processor 220 and/or store data received from any of peripheral devices operatively coupled to the processing device 200.

The processor 220 can be any suitable processor capable of executing computer instructions. Each module in the processor 220 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) configured to execute a specific function associated with managing inventory, processing and marketing products of an inventory, and so forth. The processor 220 can be a microcontroller, a FPGA, an ASIC, or any other suitable processor configured to run and/or execute those modules.

Figure 4:
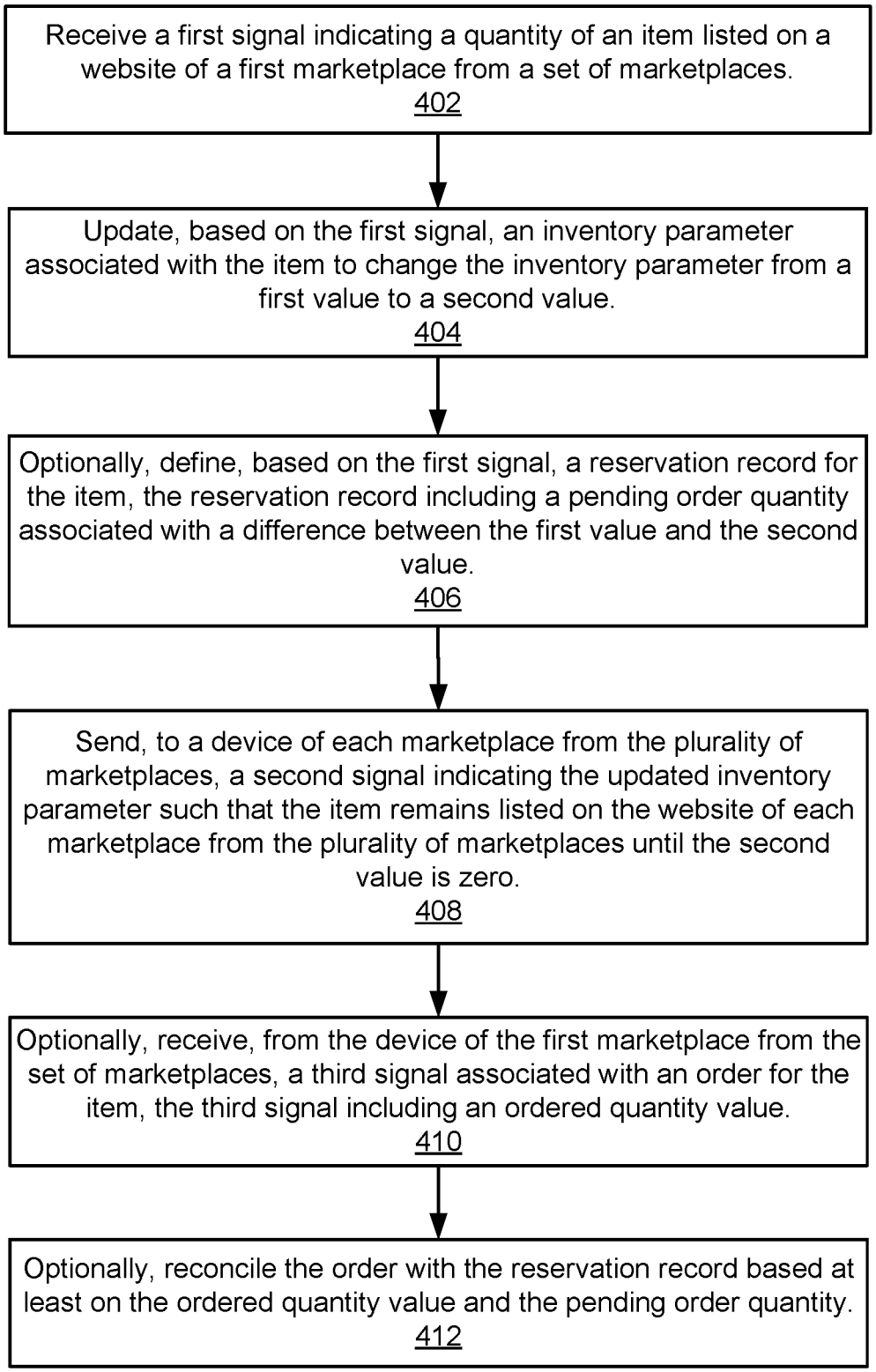
FIG. 4 is a flow chart illustrating a method for managing inventory, according to an embodiment.

The processor 220 and the modules 230-290 of the processing device 200 can be configured to collectively execute a method for managing inventory described with respect to FIGS. 3-4, and a processing method and a selling method described with respect to FIGS. 5-6. Particularly, in some embodiments, the advertisement module 250, the order module 270 and/or the tracking module 290 can be configured to collectively execute a method for managing inventory of products advertised at multiple marketplaces associated with the processing device 200. Details of implementing the method for managing inventory are described with respect to FIGS. 3 and 4.

The advertisement module 250 can be configured to implement an advertisement placement and update mechanism to place and update advertisements at e-commerce websites of the multiple marketplaces in real-time (or substantially real-time). In some embodiments, the advertisement module 250 can send advertisements and updates to advertisements to the marketplace servers of the multiple marketplaces via, for example, API accesses or other channels.

The order module 270 can be configured to receive information of orders placed and validated at the multiple marketplaces, which is provided by the marketplaces as official notifications of the orders. In some embodiments, the order module 270 can receive order information from the marketplace servers of the multiple marketplaces via, for example, API accesses or other channels. In some embodiments, an order is not considered as being fully validated and received until information of the order is received at the order module 270.

The tracking module 290 can be configured to implement various mechanisms to retrieve, from the multiple marketplaces, information associated with inventory status of the products advertised at the marketplaces. Such mechanisms can include, for example, a consumer inventory scraper, a merchant inventory scraper, a pending order poller, an order scraper, etc. By receiving information associated with inventory status via multiple different channels, the tracking module 290 can update and/or track the inventory of an item listed on each of the multiple marketplaces faster than updates based solely on information received from the order module 270. Furthermore, the tracking module 290 can be configured to implement a pending order cleanup mechanism to reconcile and/or convert pending orders based on further information received from the marketplaces.

Specifically, the pending order poller implemented at the tracking module 290 can retrieve, from a marketplace server of a marketplace from a set of marketplaces associated with the processing device 200, information associated with a pending order (i.e., an order placed at the marketplace but not yet validated or released to a merchant via standard channels as executed by the order module 270) of a product. In some embodiments, the pending order poller can be configured to retrieve information from a marketplace server in a periodic manner (e.g., every five minutes), in an event-driven manner (e.g., passively receiving the information from the marketplace server), or in any other suitable method.

In some embodiments, the pending order poller can receive the information via an API access to pending order data that is provided by the marketplace server. In other embodiments, when such an API access is not available, the pending order poller can retrieve the information by using a web scraping technique to access a merchant interface (e.g., a management portion of the merchant interface) of the marketplace server, parse and interpret web content (e.g., HTML (HyperText Markup Language) content) to locate the pending order information. After a pending order is located (via the API access or scraping), the pending order poller can define, based on the pending order, a reservation record for the product in an inventory database (e.g., the inventory database 130 in FIG. 1) associated with the processing device 200. As a result, an appropriate number of the product can be identified as being reserved for the potential customer (e.g., purchaser, renter or the like) of the product, based on the pending order. Additionally, the pending order poller can modify an existing inventory record of the product to reflect the change in the quantity of the product inventory. Furthermore, the advertisement module 250 and/or the tracking module 290 of the processing device 200 can be triggered to send a signal including the updated inventory count of the product to each marketplace server of the multiple marketplaces on which the product is listed. As a result, the inventory count for the product can be updated simultaneously (or substantially simultaneously) at each e-commerce website of the marketplaces to reflect the change in the available inventory of the product caused by the reservation.

The consumer inventory scraper implemented at the tracking module 290 can retrieve, from a consumer interface (e.g., the consumer interface 152 in FIG. 1) of the marketplace server, information associated with a change in the quantity of the product. More particularly, the consumer inventory scraper can use any number of different methods, as described below, to determine the available amount of the product inventory as advertised on the website of the marketplace. The tracking module 290 can then validate the determined available amount against the internal inventory count for the product that is stored in the inventory database. In some embodiments, the consumer inventory scraper can be configured to retrieve information from a marketplace server in a periodic manner (e.g., every hour), or in any other suitable method.

In some embodiments, the consumer inventory scraper can use a web scraping technique to access the consumer interface of the marketplace server, parse and interpret web content (e.g., HTML content) to locate any change in the quantity of the listed product. Such a change in the quantity of the listed product can be inferred from, for example, a change of quantity in an advertisement of the product presented on the e-commerce website to consumers. In other words, the consumer inventory scraper can retrieve the information by scraping (e.g., parsing and interpreting the HTML content from the website of the marketplace) the inventory count from an advertisement of the product that is presented to the consumer via the webpage of the marketplace.

In other embodiments, a consumer inventory scraper can pose as (i.e., assume an identifiable quality of and/or appear to the consumer interface as) a consumer of the marketplace to the marketplace server. More particularly, in such embodiments, the consumer inventory scraper can initiate an order and/or attempt to place an order (i.e., a mock order) as a consumer via the e-commerce webpage presented to the consumer. The consumer inventory scraper can then determine the inventory count of the product listed by the marketplace based on the response received from the marketplace server. For example, if the attempted order goes through to a payment capture stage, it indicates that the product has available inventory at the marketplace. Furthermore, the inventory count for the product can be determined based on, for example, the maximum allowable count of the product that can be placed in an order for the product. If an error message is returned in response to the attempted order, it indicates that the product has no inventory at the marketplace. That is, it appears to the marketplace that the product is sold out and has no inventory. If an out-of-stock error is returned in response to the attempted order, it indicates that the product inventory was available at the marketplace before the attempted order was placed, but has been allocated to another order during the placement of the attempted order.

Thus, the consumer inventory scraper can determine, via various methods, the available amount of the product inventory as advertised by the marketplace. Moreover, the consumer inventory scraper can validate the available inventory count against the internal inventory count for the product that is stored in the inventory database. If the internal inventory count is greater than the available inventory count determined for the marketplace, a pending order may be placed at the marketplace. As a result, for example, the tracking module 290 can define a reservation record for the product in the inventory database based on the difference between the available inventory count and the internal inventory count. Furthermore, if a reservation order is defined based on the pending order, the advertisement module 250 of the processing device 200 can be triggered to update the available inventory count of the product at each website of the marketplaces on which the product is listed. If the internal inventory count is less than the available inventory count determined for the marketplace, it indicates that the available inventory count at the marketplace is not up-to-date. In response, the advertisement module 250 of the processing device 200 can be triggered to retransmit data associated with the advertisement for the product to the marketplace server, such that the inventory count for the product is updated at the marketplace to be consistent with the internal inventory count for the product.

The merchant inventory scraper implemented at the tracking module 290 can retrieve, from a merchant interface (e.g., the merchant interface 154 in FIG. 1) of the marketplace server, information associated with a change in the quantity of the product. Such a merchant inventory scraper can pose as (i.e., assume an identifiable quality of and/or appear to the merchant interface as) a merchant of the marketplace to the marketplace server, determine the available amount of the product inventory as disclosed by the merchant interface and/or as advertised on the website of the marketplace. The tracking module 290 can then validate the determined available amount against the internal inventory count for the product that is stored in the inventory database. In some embodiments, similar to the consumer inventory scraper, the merchant inventory scraper can be configured to retrieve information from a marketplace server in a periodic manner (e.g., every hour), or in any other suitable method.

In some embodiments, for example, the merchant inventory scraper can be configured to pose as a merchant of the marketplace to log into a merchant tool system provided by the marketplace to its merchants. The merchant inventory scraper can then access the merchant interface of the marketplace server. Similar to the consumer inventory scraper, the merchant inventory scraper can retrieve the information by scraping (e.g., parsing and interpreting the HTML content from the website of the marketplace) the inventory count from an advertisement of the product that is presented and managed by the merchant via the merchant interface of the marketplace server. In other embodiments, the merchant inventory scraper can obtain the information using any other suitable methods.

After retrieving the information, the merchant inventory scraper and/or the tracking module 290 can validate the available inventory count against the internal inventory count for the product that is stored in the inventory database. Similar to the consumer inventory scraper as described above, the merchant inventory scraper can, based on the validated inventory information, infer a pending order and define a reservation order based on the pending order. As described above, the advertisement module 250 can retransmit advertisement data to the marketplace server to update the inventory count for the product in response to the information retrieved by the merchant inventory scraper. Furthermore, if a reservation order is defined based on the pending order, the advertisement module 250 of the processing device 200 can be triggered to update the available inventory count of the product at each website of the marketplaces that lists the product for sale.

The order scraper implemented at the tracking module 290 can retrieve, from the merchant interface of the marketplace server, information associated with orders placed at the marketplace. Similar to the consumer inventory scraper and the merchant inventory scraper described above, the order scraper can retrieve the information by scraping (e.g., parsing and interpreting the HTML content) the merchant interface of the marketplace server to locate and/or identify information or data associated with an order of the product. In some embodiments, information of an order can be captured by the order scraper in such a way before information of the same order is received and processed at the order module 270. In such embodiments, in response to retrieving the order information by the order scraper, the order can be recorded (e.g., by defining an order record) in the inventory database. As a result, a reservation for the product can be identified based on the order, and the inventory record of the product can be updated to reflect the change in the quantity of the available inventory accordingly. In some embodiments, such an order scraper can function as a secondary order receiving mechanism in addition to the order module 270, such that orders received via the order module 270 can be checked, validated and/or supplemented.

The pending order cleanup mechanism implemented at the tracking module 290 can handle pending orders based on further information received from the marketplaces. As described above, after a pending order is determined or inferred based on information received at, for example, the customer inventory scraper, the merchant inventory scraper and/or the pending order poller, a pending order record can be defined in the inventory database. As a result, an inventory reservation for the product can be defined or identified accordingly, and an inventory record of the product can be updated to reflect the change in the quantity of available inventory for the product.

After information of a validated order for the product is received at the processing device 200 (e.g., at the order module 270 or the order scraper of the tracking module 290), the pending order cleanup mechanism can be triggered to compare and/or reconcile the information of the validated order with the information of the pending order for the same product. In some embodiments, the validation can be performed by comparing an ordered quantity for the product in the pending order and an ordered quantity for the product in the validated order. In other embodiments, customer information (e.g., name, email address, account number, address, payment information, etc.) associated with the potential buyer of the product can be received with the information for the pending order and can be used to associate and/or reconcile the pending order with the validated order. In yet other embodiments, information specific to the marketplace associated with the pending order, such as, for example, the marketplaces order identifier can be received with the information for the pending order and can be used to associate and/or reconcile the pending order with the validated order. Such marketplace information can include, for example, a unique order number, alphanumeric code, text string or the like. If the quantity information and/or customer information of the pending order matches the corresponding information of the validated order, it indicates that the pending order and the validated order correspond to the same order of the product. Thus, the pending order and the validated order can be reconciled, and the record for the pending order can be converted to a record for a normal, validated order. Otherwise, if the quantity information and/or customer information of the pending order does not match the corresponding information of the validated order, it indicates that the pending order and the validated order do not correspond to the same order of the product. Thus, the pending order and the validated order cannot yet be reconciled, and further investigation is required. Moreover, as discussed above, reconciliation can also include the canceling of a reservation record and/or reservation event by any of the methods described herein.

In some embodiments, the processing device 200 can receive, from the marketplace server, information associated with a cancellation on a pending order. The pending order cleanup mechanism can be triggered to determine a pending order based on the cancellation, and then delete the pending order record from the inventory database, and release the corresponding reservation on the product inventory. In some embodiments, if a pending order is not validated or canceled during a predetermined, configurable period of time (e.g., 6 hours, 12 hours) after the pending order is established at the inventory database, the pending order cleanup mechanism can be triggered to cancel the pending order and release the associated reservation on the product inventory.

FIG. 3 is a flow chart illustrating a method 300 for managing inventory, according to an embodiment. The method 300 can be executed by a processing device structurally and functionally similar to the processing devices 110, 200 shown and described with respect to FIGS. 1 and 2. The processing device can be operatively coupled to a set of marketplace servers (e.g., the marketplace servers 150, 160, 170 in FIG. 1), each of which is associated with a marketplace from a set of marketplaces. Each marketplace server can host, execute and maintain an e-commerce website for the associated marketplace, via which merchants of the marketplace can post advertisements for products and consumers can view the advertisements and shop for the products. In some embodiments, a product can be advertised at the e-commerce website of each marketplace from the set of marketplaces simultaneously or substantially simultaneously (i.e., at substantially the same time). Meanwhile, information of the inventory of the product can be stored at an inventory database (e.g., the inventory database 130 in FIG. 1) that is operatively coupled to and maintained by the processing device.

The code representing instructions to perform the method 300 can be stored in, for example, a non-transitory processor-readable medium (e.g., the memory 210 in FIG. 2) in the processing device, and executed by a processor (e.g., the processor 220 in FIG. 2) of the processing device. The code includes code to be executed by the processor to cause the processing device to operate the functions illustrated in FIG. 3 and described as follows.

At 302, the processing device can receive, via a first source, a first signal associated with a quantity of an item (i.e., a product) listed on a website (e.g., an e-commerce website) of a first marketplace from the set of marketplaces. The first signal can include information associated with a change in the quantity of the item. Such a change can be caused by, for example, an order being placed for the item via the website, a decision by the first marketplace to limit the listed quantity of the item, a decision by a merchant of the item to change the listed quantity of the item, and/or the like. The first source can include, for example, an API access to a merchant interface (e.g., the merchant interface 154 in FIG. 1) and/or an API access to a consumer interface (e.g., the consumer interface 152 in FIG. 1) of a marketplace server associated with the first marketplace. In some embodiments, the first signal can be received by a pending order poller, a consumer inventory scraper or a merchant inventory scraper of the processing device, as described above, and/or the like.

At 304, the processing device can receive, via a second source, a second signal associated with the quantity of the item listed on the website of the first marketplace. The second source is different from the first source. In this manner, by receiving information associated with the quantity of the item via different sources, the actual quantity can be known more quickly than by depending solely on a single source of information. For example, the first signal can be received by the pending order poller using the API access to the merchant interface of the marketplace server associated with the first marketplace; and the second signal can be received by the consumer inventory scraper using a web scraping technique to extract information from the consumer interface of the marketplace server associated with the first marketplace (e.g., a webpage presented to the consumers of the first marketplace). Thus, the same incident (e.g., an pending order) can be determined more quickly and/or can be validated by receiving information from the two different sources associated with the first marketplace. In some embodiments, the second signal can include information associated with the same change in the quantity of the item that is indicated in the first signal. Thus, it can be inferred that the first signal and the second signal can be based on the same incident at the first marketplace such as, for example, a pending order placed at the first marketplace.

At 306, the processing device can determine an inventory parameter associated with the item based on at least one of the first signal or the second signal. In some embodiments, the inventory parameter can correspond to an updated inventory quantity for the item after a change corresponding to the first signal and/or the second signal has been made to the inventory database.

At 308, the processing device can optionally define, based on the inventory parameter, a reservation record for the item. The reservation record can include a pending order quantity. For example, when the inventory parameter corresponds to the updated inventory quantity for the item, the pending order quantity can be a difference between an initial value of the inventory quantity for the item (i.e., the inventory quantity for the item before the update) and the inventory parameter. The reservation record can be defined in the inventory database associated with the processing device. Furthermore, in response to defining the reservation record, an inventory record of the item stored in the inventory database can be modified to reflect the change in the quantity of the available inventory for item. For example, the quantity of the available inventory for the item can be reduced by the pending order quantity, to generate the updated inventory quantity for the item, which is equal to the inventory parameter.

At 310, in response to the reservation record and/or the update in the inventory record for the item, the processing device (e.g., an advertisement module similar to the advertisement module 250 in FIG. 2) can send, to a device of each marketplace from the set of marketplaces, a third signal indicating the inventory parameter. For example, the third signal can include the inventory parameter as the updated quantity of the available inventory for the item. In some instances, the inventory parameter can have a value of zero, which indicates that the item does not have any available inventory (e.g., the item is sold out). In such embodiments, the third signal can include an instruction to remove the item from the website of each marketplace from the set of marketplaces. In some other instances, the inventory parameter can have a value above zero (e.g., 1, 5, 10, etc.), which indicates at least one available item in the inventory (e.g., the item is not sold out yet). In such embodiments, the third signal can include an instruction to modify the advertisement of the item to reflect the updated inventory count for the item, such that the item remains listed, with the updated number (i.e., the inventory parameter), on the website of each marketplace from the set of marketplaces.

At 312, the processing device can optionally receive a fourth signal indicating a validated order associated with the item placed via the website of the first marketplace. The fourth signal can be received at, for example, an order scraper and/or an order module (e.g., the order module 270 in FIG. 2) of the processing device, as described above with respect to FIG. 2. The fourth signal can include an ordered quantity value, which indicates the quantity of the item specified in the order. In some embodiments, the first signal and/or the second signal can be received before the fourth signal.

For example, after an order is placed by a consumer at the website of the first marketplace and before the order is validated at the first marketplace, the pending order poller of the processing device can receive the first signal including information associated with the order, which is retrieved via an API access to the merchant interface of the marketplace server of the first marketplace. After the first signal is received and before the order is validated at the first marketplace, the consumer inventory scraper of the processing device can receive the second signal including information associated with the order, which is retrieved using a web scraping technique on the consumer interface of the marketplace server of the first marketplace. After order is validated at the first marketplace, the order module or the order scraper can receive the fourth signal. As a result, the reservation record for the item can be defined, based on the first signal and/or the second signal, before the fourth signal being received at the processing device.

At 314, the processing device can optionally reconcile the validated order with the reservation record based at least on the pending order quantity and the ordered quantity value. Specifically, as described above, a pending order cleanup mechanism can be triggered at the processing device to compare the pending order quantity and the ordered quantity value, and/or other information (e.g., customer information) included in the first, the second and/or the fourth signals. Based on the result of the comparison, the processing device can determine whether the validated order and the reservation record correspond to the same order of the item or not.

FIG. 4 is a flow chart illustrating a method 400 for managing inventory, according to an embodiment. The method 400 can be executed by a processing device structurally and functionally similar to the processing devices 110, 200 shown and described with respect to FIGS. 1 and 2. The processing device can be operatively coupled to a set of marketplace servers (e.g., the marketplace servers 150, 160, 170 in FIG. 1), each of which is associated with a marketplace from a set of marketplaces. Each marketplace server can host, execute and maintain an e-commerce website for the associated marketplace, via which merchants of the marketplace can post advertisements for products and consumers can view the advertisements and shop for the products. In some embodiments, a product can be advertised at the e-commerce website of each marketplace from the set of marketplaces simultaneously or substantially simultaneously (i.e., at substantially the same time). Meanwhile, information of the inventory of the product can be stored at an inventory database (e.g., the inventory database 130 in FIG. 1) that is operatively coupled to and maintained by the processing device.

The code representing instructions to perform the method 400 can be stored in, for example, a non-transitory processor-readable medium (e.g., the memory 210 in FIG. 2) in the processing device, and executed by a processor (e.g., the processor 220 in FIG. 2) of the processing device. The code includes code to be executed by the processor to cause the processing device to operate the functions illustrated in FIG. 4 and described as follows.

At 402, the processing device can receive a first signal indicating a quantity of an item listed on a website of a first marketplace from a set of marketplaces. The item is listed substantially simultaneously on a website of each marketplace from the set of marketplaces. In some embodiments, the first signal can indicate a pending order associated with the item.

In some embodiments, as described with respect to FIGS. 2 and 3, the first signal can be received using any one of various methods. For example, the first signal can be received at a pending order poller of the processing device using an API access to a merchant interface portion (e.g., the merchant interface 154 in FIG. 1) of the website of the first marketplace. As another example, the first signal can be received at a merchant inventory scraper or a consumer inventory scraper, which can scrape the merchant interface portion or a consumer interface portion (e.g., the consumer interface 152 in FIG. 1) of the website of the first marketplace to obtain information associated with the quantity of the item. In such a scenario, the obtained information can be included in the first signal. In yet other embodiments, the consumer inventory scraper of the processing device can initiate a mock order associated with the item via the consumer interface portion of the website of the first marketplace to obtain information associated with the available inventory for the item at the first marketplace. In such a scenario, the first signal can be received in response to the initiation of the mock order.

At 404, the processing device can update, based on the first signal, an inventory parameter associated with the item, such that the inventory parameter can be changed from a first value to a second value. Specifically, the first value represents the initial amount of available inventory for the item before the first signal is received, and the second value represents the updated amount of available inventory for the item after the first signal is received. The inventory parameter can be associated with, for example, an inventory record of the item that is store in the inventory database.

At 406, the processing device can optionally define, based on the first signal, a reservation record for the item. Such a reservation record can include a pending order quantity associated with a difference between the first value and the second value. In other words, a portion of the item inventory can be reserved for the potential pending order indicated in the first signal (but that may not yet have been received by the order module, such as the order module 270 in FIG. 2). The number of the reserved inventory for the item, which is the pending order quantity, can equal to the difference between the first value and the second value.

At 408, the processing device (e.g., an advertisement module similar to the advertisement module 250 in FIG. 2) can send, to a device (e.g., the marketplace server 150, 160 or 170 in FIG. 1) of each marketplace from the set of marketplaces, a second signal indicating the updated inventory parameter. In response, the item can remain listed on the website of each marketplace from the set of marketplaces until the second value is zero. In other words, when the updated inventory parameter has a value of zero (i.e., the second value is zero), which indicates that the item does not have any available inventory (e.g., the item is sold out), the second signal can include an instruction to remove the item from the website of each marketplace from the set of marketplaces. When the updated inventory parameter has a value above zero (i.e., the second value is above zero), which indicates at least one available item in the inventory (e.g., the item is not sold out yet), the second signal can include an instruction to modify the advertisement of the item to reflect the updated inventory parameter. Thus, the item remains listed, with the updated inventory parameter (i.e., the second value), on the website of each marketplace from the set of marketplaces. In this manner, and by this method, the item remains listed on multiple different marketplaces even when only a single item remains available.

At 410, the processing device can optionally receive, from the device of the first marketplace, a third signal associated with an order for the item. The third signal can be received at, for example, an order scraper and/or an order module (e.g., the order module 270 in FIG. 2) of the processing device, as described above with respect to FIGS. 2 and 3. The third signal can include an ordered quantity value, which indicates the quantity of the item specified in the order. In some embodiments, the first signal can be received before the third signal.

At 412, the processing device can reconcile the order with the reservation record based at least on the pending order quantity and the ordered quantity value. Specifically, as described above, a pending order cleanup mechanism can be triggered at the processing device to compare the pending order quantity and the ordered quantity value, and/or other information (e.g., customer information) included in the first signal and/or the fourth signal. Based on the result of the comparison, the processing device can determine whether the validated order and the reservation record correspond to the same order of the item or not.

In some embodiments, advertisements for a product can be simultaneously posted at multiple web sites via the methods and system described herein, such that the product can be marketed via multiple channels. Similarly stated, multiple advertisements for the same product can be simultaneously posted online (e.g., via Blinq.com, Amazon.com, and eBay.com). As a result, simultaneous multi-channel marketing for that product can be enabled.

In some embodiments, the system (e.g., the system 100) can receive information associated with the order via any suitable channel, as described above with reference to FIGS. 1-4. For example, the system can receive the order from a marketplace, as the recipient of a message directly from the marketplace, or by polling the marketplace for new orders (depending on the marketplace's specific API for order receiving). The system can exceed certain marketplaces' basic order receiving APIs in certain cases when the order receiving API does not provide up-to-the-moment data and there is another way to determine orders in real time. For example, to receive Amazon orders, the system can poll Amazon's standard order feed every half hour, and in addition the system can poll Amazon's pending orders list available at Amazon's seller-central website every minute for current order information. Orders retrieved through this pending order polling can be created in the system as pending orders and can be fully realized when the order is received through Amazon's standard order feed, as described above with reference to FIGS. 1-4.

In some embodiments, the system (e.g., the system 100) can implement additional checks to ensure all orders are received from the various marketplaces. Each marketplace can have, for example, at minimum an hourly order puller which connects to the marketplace, retrieves a list of the orders available to it, and verifies those orders are received in the system. In such embodiments, if an order is missing, the system can create the order at that time using the data provided by this verification mechanism.

In some embodiments, the orders described herein can be validated according to the methods and systems disclosed herein. That is, the system can be configured to determine whether the order has sufficient information for processing and is not determined to be a fraud. In some embodiments, to have sufficient information for processing, the order must have, for example, pertinent customer information (e.g., customer name, billing and shipping addresses, email address), filled order items, correct payment, and/or the like. In some embodiments, the system can attempt to fill oversold inventory as additional units are added to the system through the intake process.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
    cause a product to be listed for sale simultaneously on a plurality of marketplaces;
    receive a signal indicating an available quantity of the product using an application programming interface (API) for a merchant interface portion of a first marketplace from the plurality of marketplaces;
    place a mock order for the product using a consumer interface portion of the first marketplace;
    receive an error message from the first marketplace associated with a failure of the mock order;
    update an inventory parameter associated with the product from a first value to a second value based on at least one of the signal indicating the available quantity or the error message; and
    send, to each marketplace from the plurality of marketplaces, a signal to cause each marketplace from the plurality of marketplaces to remove the product such that the product is simultaneously listed on a website associated with each marketplace from the plurality of marketplaces until the second value is zero.

2. The non-transitory processor-readable medium of claim 1, the code further comprising code to cause the processor to:
    receive a signal indicating an available quantity of the product using an API for a merchant interface portion of a second marketplace from the plurality of marketplaces;
    update the inventory parameter based on the signal indicating the available quantity of the product using the API for the merchant interface portion of the second marketplace.

3. The non-transitory processor-readable medium of claim 1, the code further comprising code to cause the processor to:
    place a mock order for the product using a consumer interface portion of a second marketplace;
    receive an error message from the second marketplace associated with a failure of the mock order; and
    update the inventory parameter based on the error message from the second marketplace.

4. The non-transitory processor-readable medium of claim 1, the code further comprising code to cause the processor to:
    receive a signal indicating an available quantity of the product using an API for a merchant interface portion of a second marketplace from the plurality of marketplaces;
    place a mock order for the product using a consumer interface portion of the second marketplace;
    receive an error message from the second marketplace associated with a failure of the mock order at the second marketplace; and
    update the inventory parameter based on at least one of the signal indicating the available quantity of the product using the API for the merchant interface portion of the second marketplace or the error message from the second marketplace.

5. The non-transitory processor-readable medium of claim 1, the code further comprising code to cause the processor to:
    send a signal to each marketplace from the plurality of marketplaces via an API for a merchant interface portion for that marketplace to cause each marketplace to list the product for sale.

6. The non-transitory processor-readable medium of claim 1, wherein the code to cause the processor to list the product for sale includes code to cause the processor to specify a condition of the product of at least one of open-box, used, refurbished, salvaged, or damaged.

7. The non-transitory processor-readable medium of claim 1, wherein the code to cause the processor to cause the product to be listed includes code to send an indication of a condition of the product to each marketplace from the plurality of marketplaces such that each marketplace from the plurality of marketplaces specifies the condition of the product.

8. The non-transitory processor-readable medium of claim 7, the code further comprising code to cause the processor to:
    determine a price for the product based on the condition.

9. The non-transitory processor-readable medium of claim 7, the code further comprising code to cause the processor to:
    determine a price for the product based on the condition and external pricing data.

10. The non-transitory processor readable medium of claim 1, wherein the product includes a plurality of units having a plurality of conditions, the product simultaneously listed with each condition from the plurality of conditions on each marketplace from the plurality of marketplaces.

* * * * *